(12) United States Patent
Nakamura et al.

(10) Patent No.: US 12,199,489 B2
(45) Date of Patent: Jan. 14, 2025

(54) VEHICLE DRIVE DEVICE

(71) Applicant: TOYOTA JIDOSHA KABUSHIKI KAISHA, Toyota (JP)

(72) Inventors: Takenori Nakamura, Nagoya (JP); Shoji Hishinuma, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 17/978,553

(22) Filed: Nov. 1, 2022

(65) Prior Publication Data
US 2023/0163656 A1 May 25, 2023

(30) Foreign Application Priority Data

Nov. 22, 2021 (JP) .................. 2021-189346

(51) Int. Cl.
*H02K 5/10* (2006.01)
*H02K 5/24* (2006.01)

(52) U.S. Cl.
CPC ............. *H02K 5/10* (2013.01); *H02K 5/24* (2013.01)

(58) Field of Classification Search
CPC .. H02K 5/10; H02K 5/24; H02K 5/06; H02K 5/04
See application file for complete search history.

(56) References Cited

U.S. PATENT DOCUMENTS

2020/0408297 A1* 12/2020 Ishikawa ................ B60K 17/04

FOREIGN PATENT DOCUMENTS

| JP | 2012050298 A | * | 3/2012 | ......... G11B 19/2009 |
|---|---|---|---|---|
| JP | 2014-236575 A | | 12/2014 | |
| JP | 2015-030370 A | | 2/2015 | |
| JP | 6079944 B2 | | 2/2017 | |
| JP | 2020-054073 A | | 4/2020 | |
| JP | 2021-058000 A | | 4/2021 | |
| JP | 2021-058038 A | | 4/2021 | |

* cited by examiner

*Primary Examiner* — Tulsidas C Patel
*Assistant Examiner* — Joshua Kiel M Rodriguez
(74) *Attorney, Agent, or Firm* — Oliff PLC

(57) ABSTRACT

A vehicle drive device includes: a rotary electric machine including a coil end around a rotation shaft on an end face in a rotation shaft direction; a cover that covers the end face; and a plate-shaped member that is fixed to a back surface of the cover and that faces at least a part of the coil end, in which the cover includes one or more first ribs extending outward from the rotation shaft in a front view of the end face, and in which the plate-shaped member extends along a direction orthogonal to a direction in which the one or more first ribs extend.

5 Claims, 7 Drawing Sheets

VEHICLE DRIVE DEVICE

CROSS-REFERENCE TO RELATED APPLICATION

This application claims priority to Japanese Patent Application No. 2021-189346 filed on Nov. 22, 2021, incorporated herein by reference in its entirety.

BACKGROUND

1. Technical Field

The present disclosure relates to a vehicle drive device.

2. Description of Related Art

Battery electric vehicles and hybrid electric vehicles are equipped with a drive device provided with a rotary electric machine such as a motor or a generator serving as a drive source. The rotary electric machine is housed in a case and is covered with a cover (see, for example, Japanese Unexamined Patent Application Publication No. 2020-54073 (JP 2020-54073 A)).

SUMMARY

The cover is formed to be thin in order to make it easy to mount the drive device on the vehicle and to reduce the weight of the vehicle. Thus, the cover is likely to generate vibration and noise due to a rotation of the rotary electric machine, which may reduce a noise vibration (NV) performance of the vehicle.

Further, when the drive device is arranged near a side member of the vehicle, for example, there is a possibility that the side member is damaged and comes into contact with the cover when the vehicle collides. In this case, there is possibility that a fragile portion of the cover is damaged and that not only the fragments come into contact with the coil of the rotary electric machine during energization, but also the coil are exposed to the outside from the damaged portion.

The present disclosure has been made in view of the above problems, and an object of the present disclosure is to provide a vehicle drive device capable of improving an NV performance and safety of a vehicle.

A vehicle drive device of the present disclosure includes: a rotary electric machine including a coil end around a rotation shaft on an end face in a rotation shaft direction; a cover that covers the end face; and a plate-shaped member that is fixed to a back surface of the cover and that faces at least a part of the coil end, in which the cover includes one or more first ribs extending outward from the rotation shaft in a front view of the end face, and in which the plate-shaped member extends along a direction orthogonal to a direction in which the one or more first ribs extend.

In the above configuration, there may be a plurality of the first ribs, and the plate-shaped member may be provided so as to bridge over the first ribs in a front view of the cover.

In the above configuration, the plate-shaped member may be screwed to the back surface.

In the above configuration, a holding portion for holding one end of the rotation shaft may be provided on the back surface, and the plate-shaped member may be fixed to the back surface at an end portion on the holding portion side.

In the above configuration, the cover may include a bending portion that bends toward the coil end side, and a gap between an outer peripheral edge of the plate-shaped member and the bending portion may be smaller than a size of a finger.

In the above configuration, the plate-shaped member may face a part of the coil end and may be fixed to the back surface at both end portions in a direction in which the plate-shaped member extends.

In the above configuration, the plate-shaped member may be provided with a second rib along a direction in which the plate-shaped member extends.

In the above configuration, the plate-shaped member may be provided with an overhanging portion that overhangs to an outer side of the coil end.

According to the present disclosure, the NV performance and safety of the vehicle can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Vehicle Drive System

Figure 1:
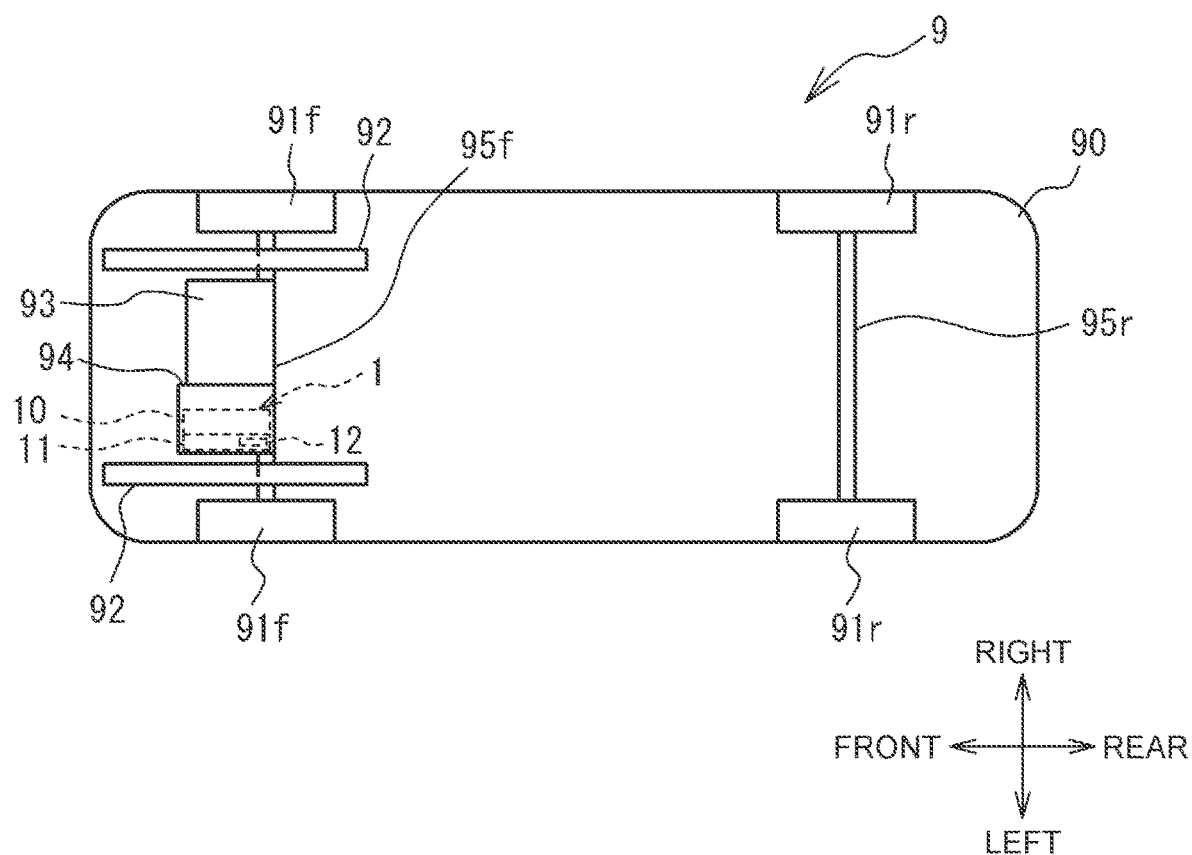
FIG. 1 is a top view showing an example of a configuration of a vehicle drive system.
Figure 2:
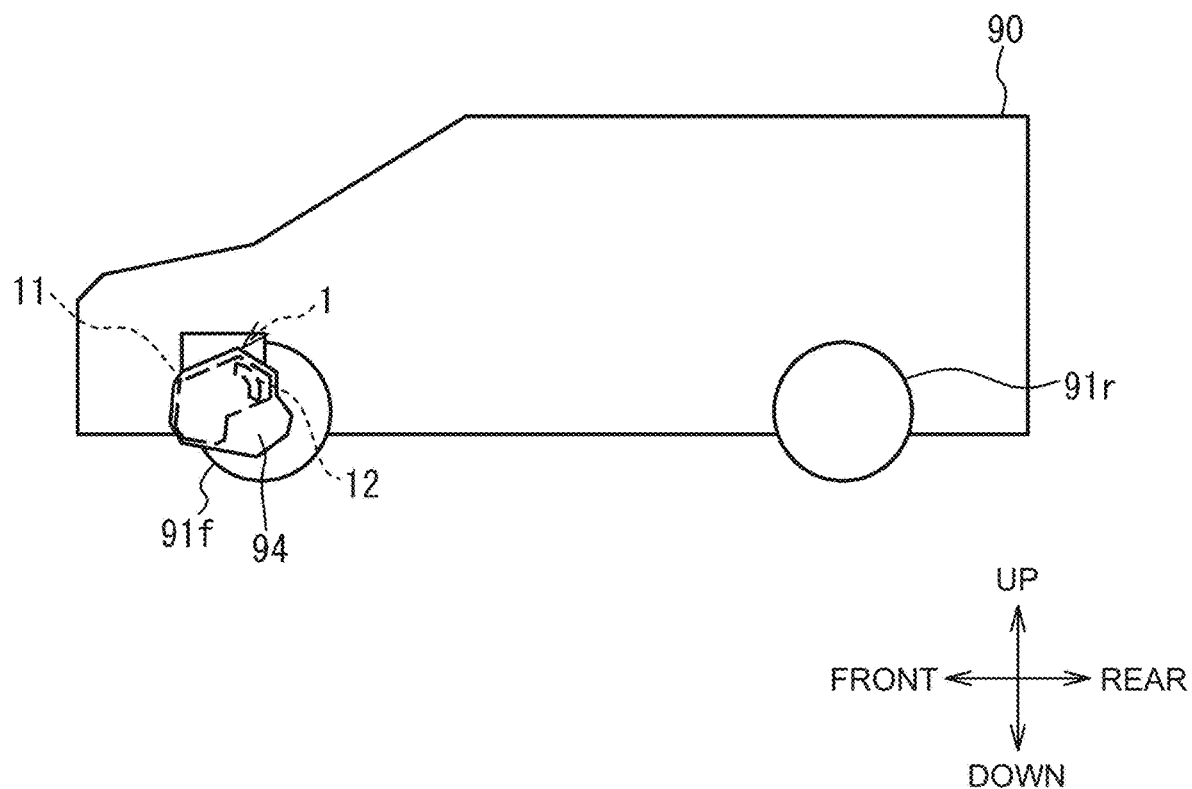
FIG. 2 is a left side view showing an example of the configuration of a vehicle drive system.

FIG. 1 is a top view showing an example of a configuration of a drive system of a vehicle 9, and FIG. 2 is a left side view showing an example of a configuration of the drive system of the vehicle 9. In this example, a hybrid electric vehicle is mentioned as the vehicle 9 on which a drive device 1 is mounted. However, the present disclosure is not limited to this, and the vehicle 9 may be a battery electric vehicle. In addition, in FIG. 1 and FIG. 2, arrows indicating a front-rear direction, a left-right direction, and an up-down direction with respect to a traveling direction of the vehicle 9 are shown. This direction is the same in FIGS. 3, 5, 6, and 7. FIG. 1 schematically shows an internal configuration when a vehicle body 90 is viewed from above, and FIG. 2 schematically shows an internal configuration when the vehicle body 90 is viewed from a left side surface.

The vehicle 9 includes the drive device 1, a pair of front wheels 91*f*, a pair of rear wheels 91*r*, a front drive shaft 95*f*, a rear drive shaft 95*r*, a pair of front side members 92, an engine 93, and a transaxle 94. The pair of front wheels 91*f* is connected to each other via the front drive shaft 95*f*, and the pair of rear wheels 91*r* are connected to each other via the rear drive shaft 95*r*.

The engine 93 and the transaxle 94 are installed in a front compartment of the vehicle 9 and are connected to the front drive shaft 95*f*. The front side members 92 are provided on the left and right sides of both the engine 93 and the transaxle 94. The transaxle 94 is connected to the engine 93 so that the power of the engine 93 can be transmitted to the front drive shaft 95*f* via a transmission mechanism.

The transaxle 94 is provided with the drive device 1 including a rotary electric machine in addition to a power transmission mechanism such as a transmission. The drive device 1 has a case 10 for accommodating the rotary electric machine and a cover 11 for covering an end face of the rotary electric machine. The cover 11 is formed to be thin in order to make it easy to mount the drive device 1 on the vehicle 9 and to reduce the weight of the vehicle 9.

The drive device 1 is arranged near, for example, the front side member 92 on the left side. Thus, when the vehicle 9 collides, the front side member may be damaged and come into contact with the cover 11. In this case, there is possibility that a fragile portion of the cover 11 is damaged and that not only the fragments come into contact with the coil of the rotary electric machine during energization, but also the coil are exposed to the outside from the damaged portion.

Thus, the drive device 1 has a protective plate 12 that covers at least a part of the coil so that the cover 11 is not damaged and the coil is not exposed. The details of the configuration of the drive device 1 will be described below.

Configuration of Drive Device

Figure 3:
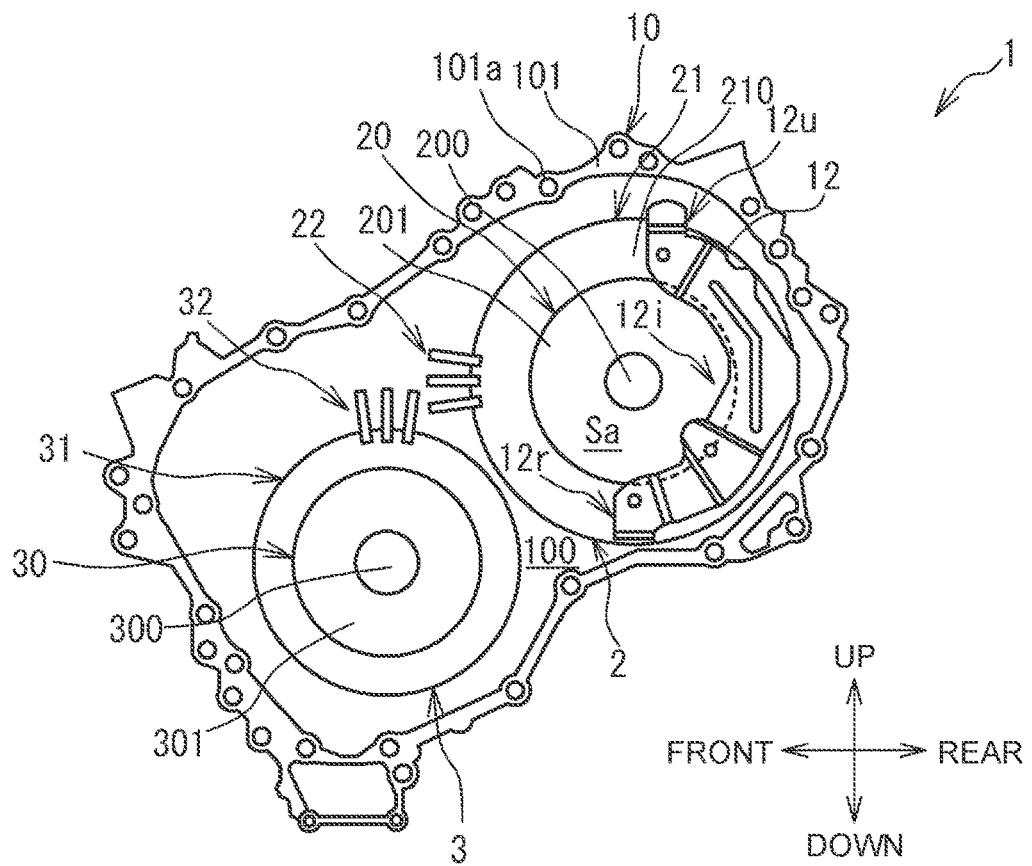
FIG. 3 is a front view showing an example of an internal configuration of a drive device when a cover is removed.

FIG. 3 is a front view showing an example of the internal configuration of the drive device 1 when the cover 11 is removed. The drive device 1 is an example of a vehicle drive device, and drives the vehicle 9. In FIG. 2, arrows indicating the front-rear direction and the up-down direction with respect to the traveling direction of the vehicle 9 are shown.

The drive device 1 includes rotary electric machines 2 and 3, the case 10, the cover 11, and the protective plate 12. The case 10 has an opening surface 100 that opens to the left direction with respect to the traveling direction of the vehicle 9, and accommodates the rotary electric machines 2 and 3. The case 10 has an outer edge portion 101 that defines the opening surface 100. The outer edge portion 101 is provided with a screw hole 101*a* for assembling the cover 11 to the case 10. The case 10 is made of aluminum as an example.

The rotary electric machine 2 is a motor that drives the front drive shaft 95*f*, and the rotary electric machine 3 is a generator that generates electricity by the driving force of the engine 93. The rotary electric machine 2 is located rearward with respect to the traveling direction of the vehicle 9, and the rotary electric machine 3 is located forward with respect to the traveling direction.

The rotary electric machine 2 has a rotor 20 and a coil 21. The rotor 20 has a rotation shaft 200 and a rotor core 201. The rotary electric machine 2 is arranged so that the rotation shaft 200 is aligned in the left-right direction with respect to the traveling direction.

Further, the coil 21 is wound around teeth of a stator core (not shown) extending in the left-right direction with respect to the traveling direction. A coil end 210 is provided around the rotation shaft 200 and the rotor core 201 on an end face Sa of the rotor 20 in the direction of the rotation shaft 200. The coil end 210 is an end portion of the coil 21 that is exposed to the outside.

The coil 21 is provided with a terminal 22 to which power is supplied from a power unit (not shown). The coil 21 generates a rotating magnetic field by a three-phase alternating current input from the terminal 22. The rotor 20 rotates according to a rotating magnetic field.

Further, the rotary electric machine 3 has a coil 31 wound around a stator core (not shown) and a rotor 30 inside the stator core, similar to the rotary electric machine 2 described above. The rotor 30 has a rotation shaft 300 and a rotor core 301. The rotary electric machine 3 is arranged so that the rotation shaft 300 is aligned in the left-right direction with respect to the traveling direction. The coil 31 is provided with a terminal 32 for outputting the generated electric power. The terminal 32 is connected to, for example, a battery (not shown).

The protective plate 12 is fixed to the back surface of the cover 11 so as to face a part of the coil end 210. The position where the protective plate 12 is fixed is determined according to, for example, a surface rigidity of the cover 11. When the protective plate 12 is fragile, for example, when the surface rigidity of the rear portion of the cover 11 is lower than the other portions with respect to the traveling direction of the vehicle 9, the protective plate 12 is fixed so as to face the portion on rear side of the coil end 210 covered by the fragile portion of the cover 11.

Thus, even when the front side member 92 is damaged and comes into contact with the fragile portion of the cover 11 and the portion is damaged, since the area on the rear side of the coil end 210 is covered by the protective plate 12, the area on the rear side of the coil end 210 is suppressed from being exposed to the outside of the cover 11 and safety is ensured.

Figure 4:
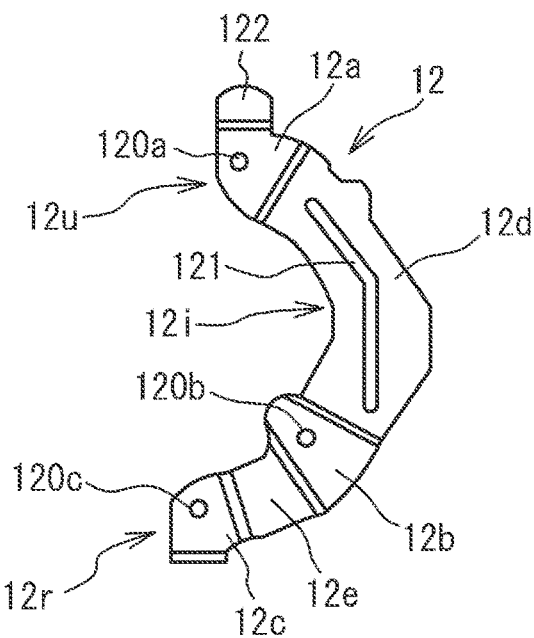
FIG. 4 is a plan view showing an example of a protective plate.

FIG. 4 is a plan view showing an example of the protective plate 12. This will be described below with reference to FIG. 4 together with FIG. 3.

The protective plate 12 is an example of a plate-shaped member facing at least a part of the coil end 210. A plate surface of the protective plate 12 is formed so as to draw an arc according to the shape of a part of the coil end 210 that the plate surface is covering. The protective plate 12 is made of, for example, iron, but is not limited to this.

The protective plate 12 includes fixing portions 12*a* to 12*c* provided with screw holes 120*a* to 120*c* respectively, connecting portions 12*d* and 12*e* connecting between the fixing portions 12*a* to 12*c*, and an overhanging portion 122 protruding upward from the fixing portion 12*a*. The fixing portion 12*a* is provided at an upper end portion 12*u* and the fixing portion 12*c* is provided at a lower end portion 12*r* with respect to the traveling direction of the vehicle 9. The fixing portions 12*a* and 12*b* are connected by the connecting portion 12*d*, and the fixing portions 12*b* and 12*c* are connected by the connecting portion 12*d*.

A step is provided between the fixing portions 12*a* to 12*c* and the connecting portions 12*d* and 12*e*. The plate surfaces of the fixing portions 12*a* to 12*c* and the plate surfaces of the connecting portions 12*d* and 12*e* spread out at different positions in the left-right direction. A length of the connecting portion 12*d* extending between the fixing portions 12*a* and 12*b* is longer than A length of the connecting portion 12*e* extending between the fixing portions 12*b* and 12*c*.

The connecting portion 12*d* is provided with a rib 121 along the extending direction thereof. The rib 121 protrudes toward the cover 11 side, but conversely, the rib 121 may protrude toward the coil end 210 side. As described above, since the protective plate 12 is provided with the rib 121 along the direction in which the protective plate 12 extends, its surface rigidity is increased as compared with the case without the rib 121. The rib 121 is an example of a second rib.

The overhanging portion 122 functions as a handle when an operator attaches or detaches the protective plate 12. The plate surface of the overhanging portion 122 is inclined toward the case 10 with respect to the plate surface of the fixing portion 12a. The overhanging portion 122 protrudes to the outside of the coil end 210 when viewed from the rotation shaft 200. Thus, the operator can easily attach or remove the protective plate 12.

Further, the screw holes 120a to 120c are provided at an end portion 12i of the fixing portions 12a to 12c on the rotation shaft 200 side. That is, the screw holes 120a to 120c are provided on the inner peripheral side of the fixing portions 12a to 12c when viewed from the rotation shaft 200.

Figure 5:
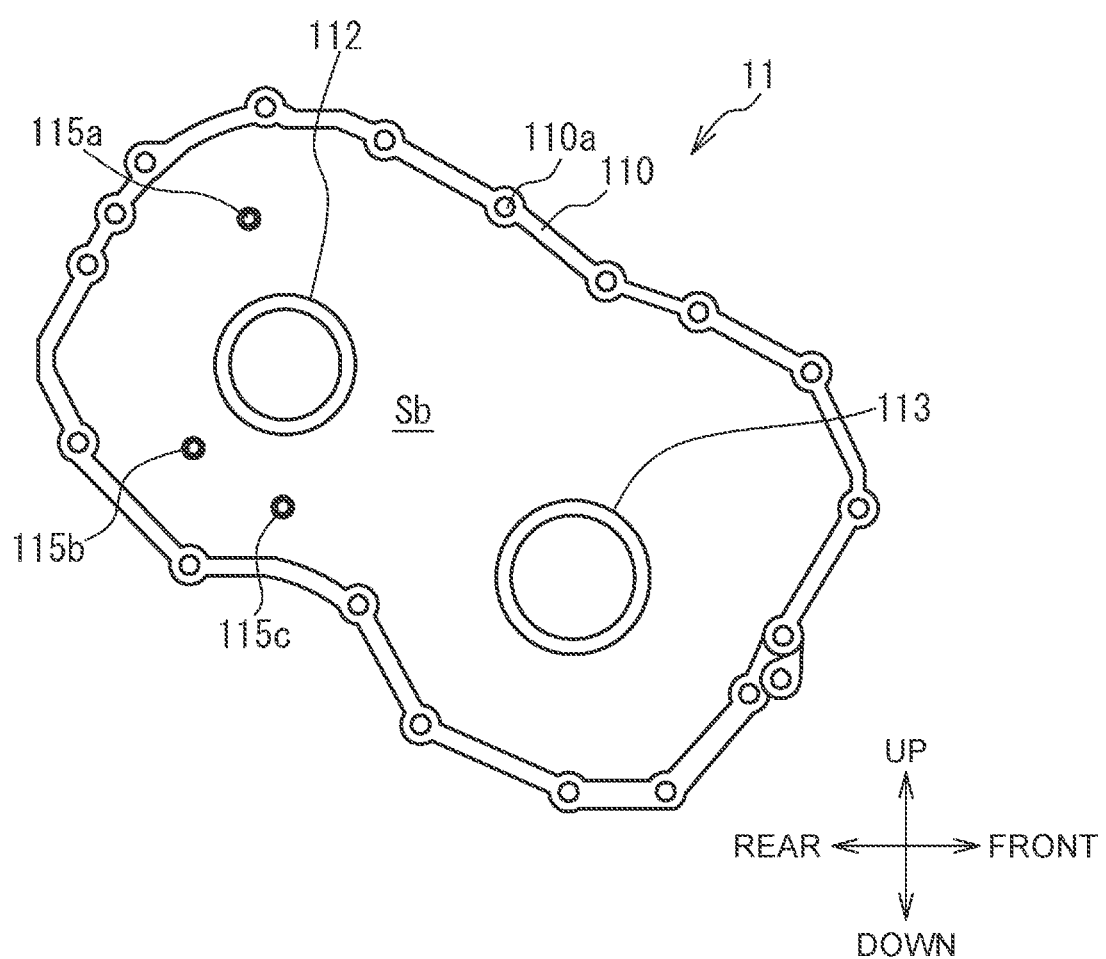
FIG. 5 is a rear view showing an example of a cover when the protective plate is removed.

FIG. 5 is a rear view showing an example of the cover 11 when the protective plate 12 is removed. A back surface Sb of the cover 11 is provided with shaft holding portions 112, 113 and fastening holes 115a to 115c. The outer edge portion 110 fixed to the outer edge portion 101 of the case 10 is provided around the back surface Sb. The back surface Sb is defined by the outer edge portion 110. The outer edge portion 110 is provided with a screw hole 110a for assembling the cover 11 to the case 10. The cover 11 is made of aluminum as an example.

The shaft holding portions 112 and 113 have, for example, a substantially cylindrical shape, and internally hold the end portions of the rotation shafts 200 and 300, respectively. The shaft holding portions 112 and 113 are provided with, for example, bearings corresponding to the rotation shafts 200 and 300. The shaft holding portion 112 is an example of a holding portion that holds one end of the rotation shaft 200.

The fastening holes 115a to 115c are used for fixing the protective plate 12. The fastening holes 115a to 115c correspond to the screw holes 120a to 120c of the protective plate 12, respectively.

Figure 6:
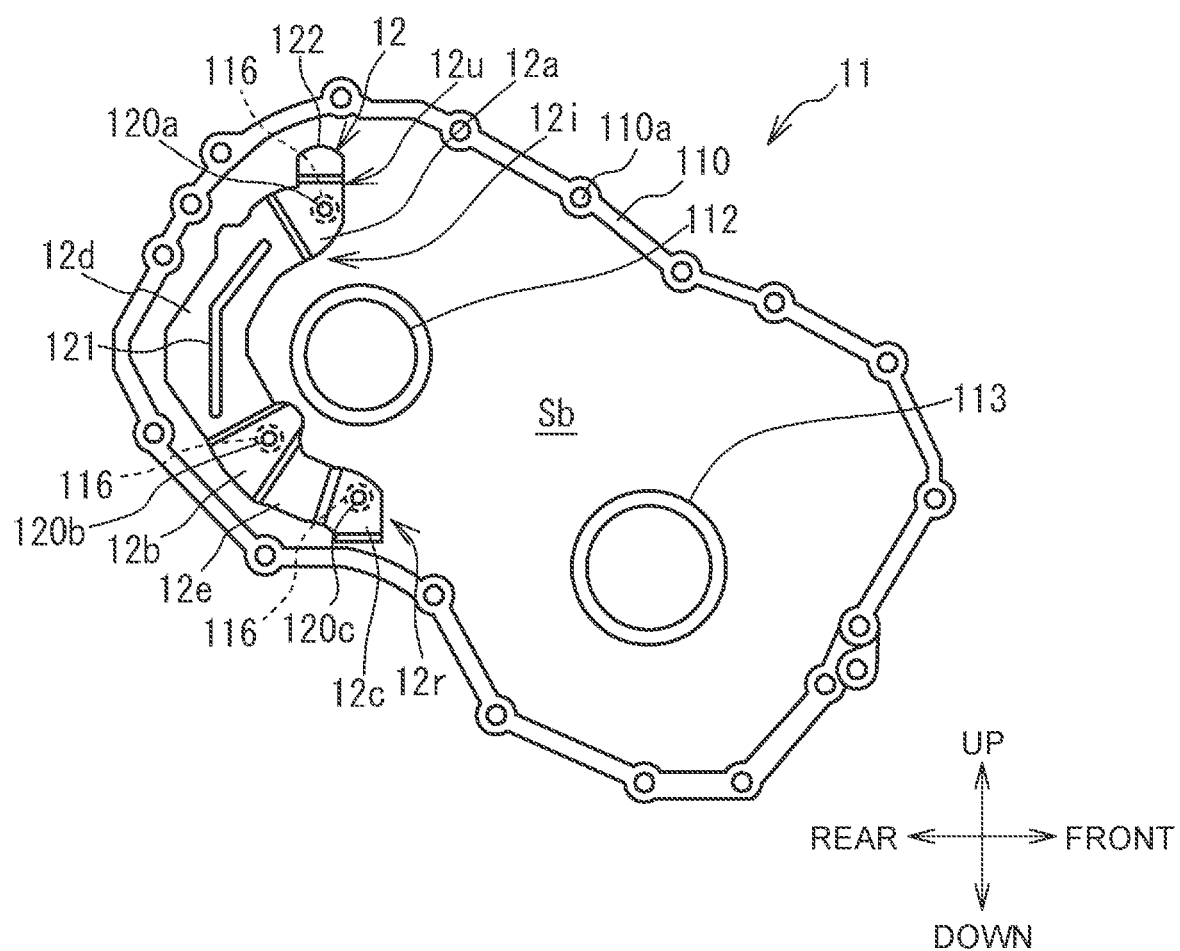
FIG. 6 is a rear view showing an example of the cover when the protective plate is attached.

FIG. 6 is a rear view showing an example of the cover 11 when the protective plate 12 is attached. In FIG. 6, the same reference numerals are given to the configurations common to those in FIG. 5, and the description thereof will be omitted. The protective plate 12 is attached so as to be substantially parallel to, for example, an end face Sa of the rotary electric machine 2.

The screw holes 120a to 120c of the protective plate 12 overlap with the fastening holes 115a to 115c of the cover 11, respectively. The protective plate 12 is screwed to the back surface Sb by screwing a screw 116 through the screw holes 120a to 120c into the fastening holes 115a to 115c, respectively. Thus, the protective plate 12 can increase the rigidity of the cover 11 as compared with the case where the protective plate 12 is fixed to the cover 11 by fitting, for example.

As described above, the screw holes 120a to 120c are provided at the end portion 12i of the fixing portions 12a to 12c on the rotation shaft 200 side, and thus are located on the shaft holding portion 112 side. In the cover 11, since the shaft holding portion 112 has higher rigidity than the other portions, by having the protective plate 12 fixed at the end portion 12i on the shaft holding portion 112 side by the back surface Sb, the rigidity of the cover 11 can be increased compared to the case in which the protective plate 12 is fixed on the opposite side of the end portion 12i.

Further, as described above, the screw holes 120a and 120c are provided at the end portions 12u and 12r in the vertical direction with respect to the traveling direction of the vehicle 9. As a result, the protective plate 12 is fixed to the back surface Sb at both end portions 12u and 12r in the extending direction. Thus, the vibration of the protective plate 12 due to the rotation of the rotary electric machines 2 and 3 is suppressed as compared with the case where the protective plate 12 is fixed at the center in the extending direction.

Figure 7:
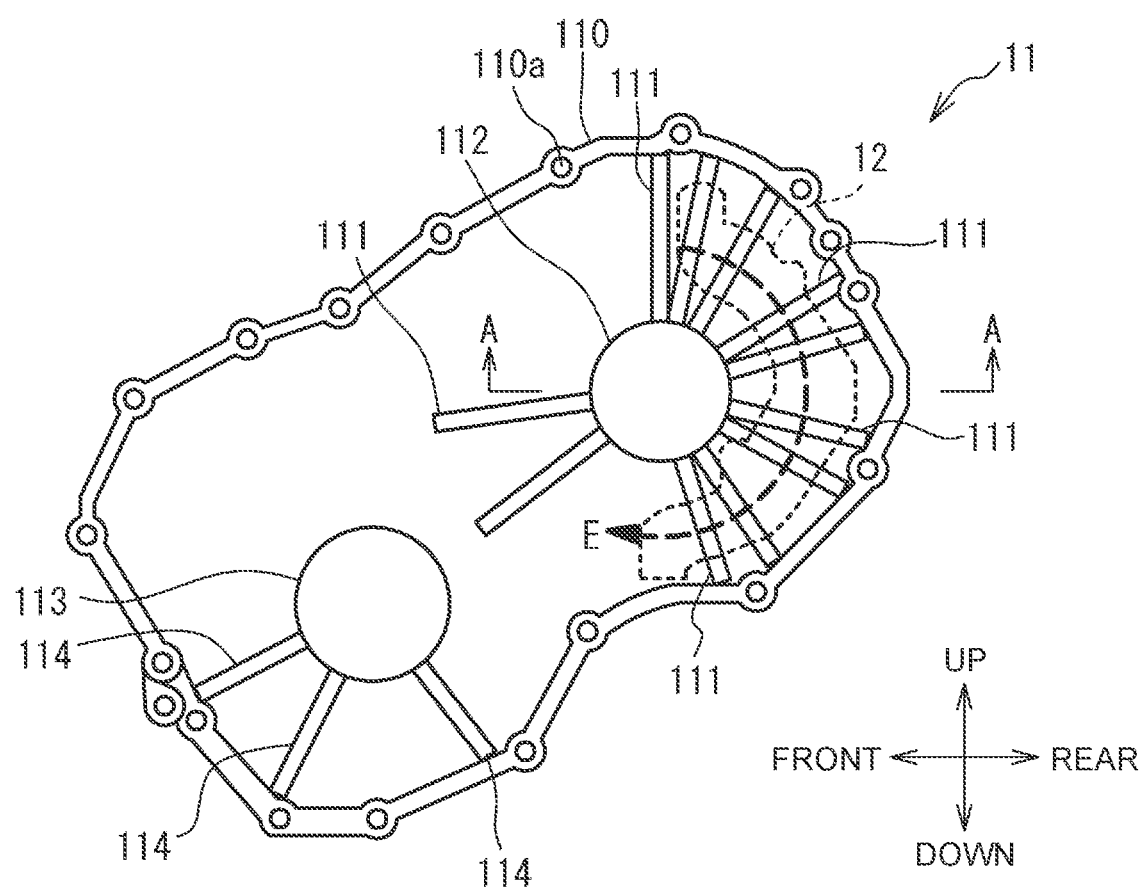
FIG. 7 is a front view showing an example of the cover.

FIG. 7 is a front view showing an example of the cover 11. When the cover 11 is viewed from the front, the shaft holding portions 112 and 113 are provided at positions overlapping the rotation shafts 200 and 300, respectively. The substantially circular bottoms of the shaft holding portions 112 and 113 protrude to the front side of the cover 11.

The cover 11 has a plurality of ribs 111 extending radially from the shaft holding portion 112 toward the outer edge portion 110. The direction in which the ribs 111 extend is the direction from the rotation shaft 200 to the outside when the end face Sa (see FIG. 3) in the direction of the rotation shaft 200 is viewed from the front. The ribs 111 are raised so as to protrude to the left with respect to the traveling direction of the vehicle 9.

Thus, even when the cover 11 is thin (for example, 4 (mm)), the rigidity of the cover 11 in the extending direction of the rib 111 is improved by the rib 111. However, the rigidity of the cover 11 in the direction orthogonal to the rib 111 is not improved.

Thus, the protective plate 12 is fixed to the back surface of the cover 11 so as to extend along a direction E orthogonal to the extending direction of the rib 111. Thus, the rigidity of the cover 11 is improved not only in the direction in which the rib 111 extends but also in the direction E orthogonal to the direction in which the rib 111 extends. Thus, the surface rigidity of the cover 11 is improved.

Thus, the vibration of the cover 11 due to the rotation of the rotation shaft 200 in the shaft holding portion 112 is suppressed, and an NV performance of the vehicle 9 is improved. The ribs 111 are an example of the first ribs, and the number of ribs 111 is not limited, and the required number of ribs 111 may be provided in the fragile portion of the cover 11.

However, as in this example, when a plurality of the ribs 111 is provided on the front surface of the cover 11, the rigidity of the cover 11 is improved as compared with the case where only a single rib 111 is provided. Further, since the protective plate 12 is provided so as to bridge over the ribs 111 in the front view of the cover 11, it is possible to further improve the surface rigidity of the portion between the ribs 111.

Further, the direction in which the protective plate 12 extends does not necessarily have to be 90 degrees with respect to the extending direction of each rib 111, and may be, for example, 75 degrees to 105 degrees. That is, when the protective plate 12 is substantially orthogonal along the direction E orthogonal to the direction in which the rib 111 extends, the surface rigidity of the cover 11 can be improved.

Further, a plurality of ribs 114 is also provided in the direction from the shaft holding portion 113 toward the outer edge portion 110. Thus, the rigidity of the cover 11 is improved in the direction in which the ribs 114 extend.

Figure 8:
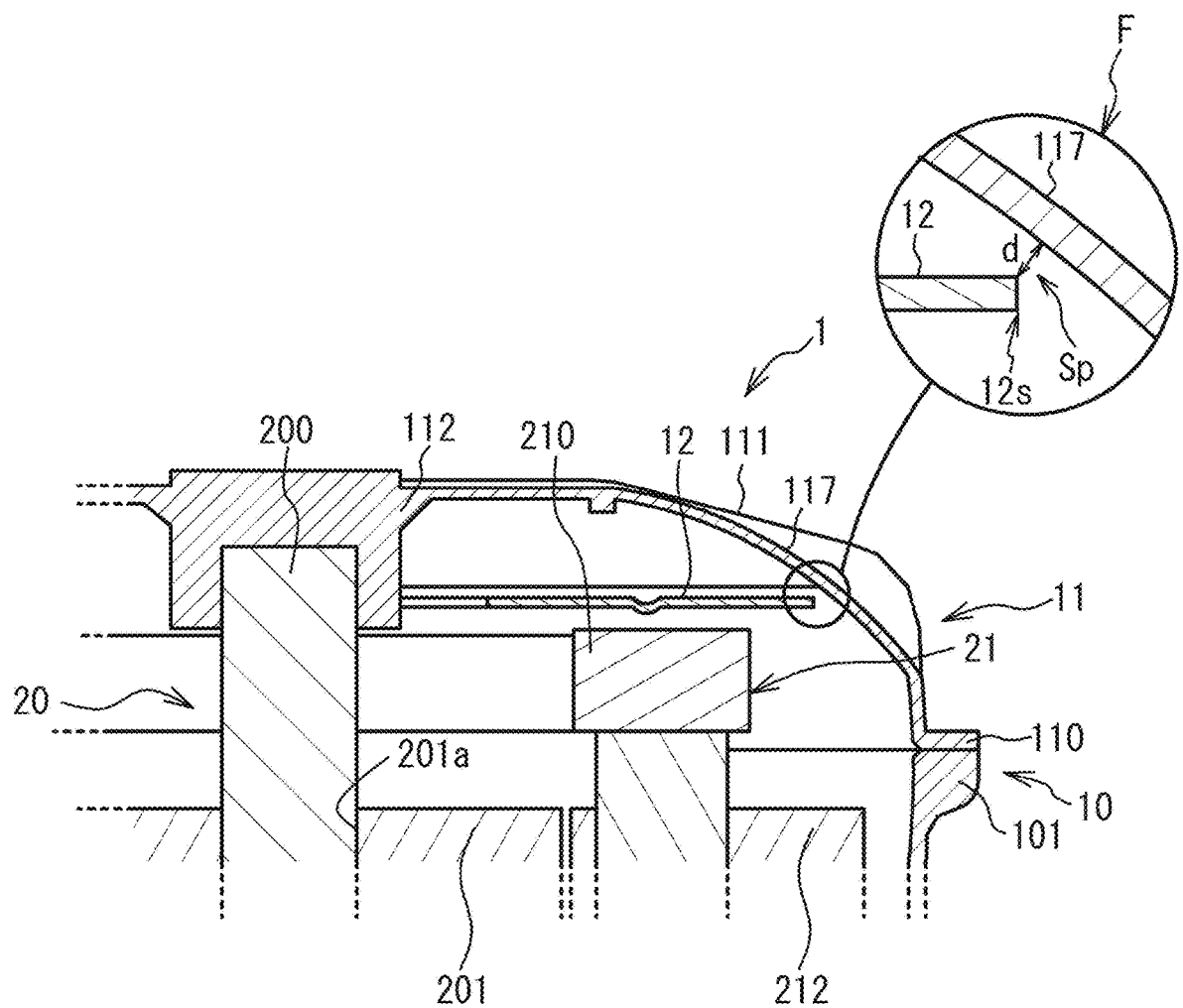
FIG. 8 is a partial cross-sectional view of the drive device along line A-A of FIG. 7.

FIG. 8 is a partial cross-sectional view of the drive device 1 along the line A-A of FIG. 7. A reference numeral F in FIG. 8 is shown by enlarging an area indicated by a dotted circle.

One end of the rotation shaft 200 is held by the shaft holding portion 112. The rotation shaft 200 is press-fitted into a center hole 201a of the rotor core 201.

A stator core 212 is provided on the outer peripheral side of the rotor core 201. The coil 21 is wound around the stator core 212. The coil end 210 is provided around the rotation shaft 200 and is exposed from the stator core 212. The end face of the coil end 210 on the cover 11 side faces the protective plate 12. Thus, even if the cover 11 is damaged and the protective plate 12 is exposed to the outside, the exposure of the coil end 210 during energization is suppressed.

Between the shaft holding portion 112 and the outer edge portion 110, the cover 11 includes a bending portion 117 that bends toward the coil end 210 side. A gap Sp between an outer peripheral end 12s of the protective plate 12 and the bending portion 117 is smaller than the size of a finger. Thus, when at least a part of the protective plate 12 is exposed to the outside from the damaged portion of the cover 11 due to the breakage of the cover 11, a driver or the operator is suppressed from directly touching the coil end 210 with their finger from the gap Sp between the outer peripheral end 12s of the protective plate 12 and the bending portion 117.

For example, a shortest distance d between the outer peripheral end 12s of the protective plate 12 and the bending portion 117 is 12 (mm) or less. Here, 12 (mm) correspond to a diameter of a fingertip of a finger. As a result, it is possible to suppress a finger from being inserted from the damaged portion of the cover 11 and coming into contact with the coil end 210 on the back side of the protective plate 12.

The embodiments described above are examples of preferred embodiments of the present disclosure. However, the present disclosure is not limited to this, and various modifications can be made without departing from the gist of the present disclosure.

What is claimed is:

1. A vehicle drive device comprising:
   a rotary electric machine including a coil end around a rotation shaft on an end face in a rotation shaft direction;
   a cover that covers the end face; and
   a plate-shaped member that is fixed to a back surface of the cover and that faces at least a part of the coil end, wherein
   the cover includes one or more first ribs extending outward from the rotation shaft in a front view of the end face,
   the plate-shaped member extends along a direction orthogonal to a direction in which the one or more first ribs extend,
   a holding portion for holding one end of the rotation shaft is provided on the back surface of the cover,
   the plate-shaped member has a semicircular arc shape along a surface of the coil end,
   the plate-shaped member includes first, second and third fixing portions provided with first, second and third screw holes respectively, a first connecting portion connecting between the first fixing portion and the second fixing portion, and a second connecting portion connecting between the second fixing portion and the third fixing portion,
   a length of the first connecting portion is longer than a length of the second connecting portion,
   the first, second and third screw holes are provided on an inner peripheral side of the first, second and third fixing portions when viewed from the rotation shaft,
   the plate-shaped member is screwed to the back surface of the cover through the first, second and third screw holes, and
   the direction in which the plate-shaped member extends is equal to or more than 75 degrees and equal to or less than 105 degrees with respect to the direction in which the one or more first ribs extend.

2. The vehicle drive device according to claim 1, wherein there is a plurality of the first ribs, and
   wherein the plate-shaped member is provided so as to bridge over the first ribs in a front view of the cover.

3. The vehicle drive device according to claim 1, wherein the plate-shaped member is provided with a second rib along the direction in which the plate-shaped member extends.

4. The vehicle drive device according to claim 1, wherein the plate-shaped member is provided with an overhanging portion that overhangs to an outer side of the coil end.

5. The vehicle drive device according to claim 1, wherein a first step is provided between the first fixing portion and the first connecting portion, a second step is provided between the second fixing portion and the first connecting portion, and a third step is provided between the third fixing portion and the second connecting portion.

* * * * *